(12) United States Patent
Matsuoka et al.

(10) Patent No.: US 8,642,699 B2
(45) Date of Patent: Feb. 4, 2014

(54) FLUIDITY IMPROVER FOR AROMATIC POLYCARBONATE RESIN, PROCESS FOR PRODUCING THE FLUIDITY IMPROVER FOR AROMATIC POLYCARBONATE RESIN, AROMATIC POLYCARBONATE RESIN COMPOSITION, AND MOLDED PRODUCT

(75) Inventors: Shinji Matsuoka, Otake (JP); Hidetaka Anma, Shizuoka (JP); Kazuyuki Miyake, Shizuoka (JP)

(73) Assignees: Mitsubishi Rayon Co., Ltd., Tokyo (JP); Koito Manufacturing Co., Ltd., Tokyo (JP)

(*) Notice: Subject to any disclaimer, the term of this patent is extended or adjusted under 35 U.S.C. 154(b) by 540 days.

(21) Appl. No.: 12/921,689

(22) PCT Filed: Mar. 11, 2009

(86) PCT No.: PCT/JP2009/054651
§ 371 (c)(1),
(2), (4) Date: Sep. 9, 2010

(87) PCT Pub. No.: WO2009/113573
PCT Pub. Date: Sep. 17, 2009

(65) Prior Publication Data
US 2011/0009567 A1    Jan. 13, 2011

(30) Foreign Application Priority Data

Mar. 11, 2008  (JP) .................................. 2008-060889

(51) Int. Cl.
*C08F 220/10* (2006.01)
*C08L 69/00* (2006.01)

(52) U.S. Cl.
USPC ............................. 525/55; 525/199; 526/326

(58) Field of Classification Search
USPC ..................................... 525/199, 326; 526/55
See application file for complete search history.

(56) References Cited

U.S. PATENT DOCUMENTS

| 4,906,696 A | 3/1990 | Fischer et al. |
| 4,937,285 A | 6/1990 | Wittmann et al. |
| 2005/0159533 A1 | 7/2005 | Nabeshima et al. |
| 2007/0213451 A1 | 9/2007 | Nabeshima et al. |
| 2007/0260015 A1 | 11/2007 | Stork et al. |
| 2010/0029855 A1 | 2/2010 | Matsuoka et al. |

FOREIGN PATENT DOCUMENTS

| DE | 10 2004 059 243 A1 | 2/2006 | |
| EP | 1 010 725 A2 | 6/2000 | |
| EP | 2 100 918 A1 * | 9/2009 | ............. C08L 69/00 |
| JP | 58-49942 | 3/1983 | |
| JP | 64-81807 | 3/1989 | |
| JP | 1-115914 | 5/1989 | |
| JP | 1 165656 | 6/1989 | |
| JP | 6-306230 | 11/1994 | |
| JP | 2000-178432 | 6/2000 | |
| JP | 2006-201667 | 8/2006 | |
| JP | 2006-249292 | 9/2006 | |
| JP | 2006-257195 | 9/2006 | |
| JP | 2006 306958 | 11/2006 | |
| JP | 2007 39490 | 2/2007 | |
| WO | WO 98/27159 | 6/1998 | |
| WO | 2005 030819 | 4/2005 | |
| WO | WO 2006/077813 A1 | 7/2006 | |
| WO | 2008 081791 | 7/2008 | |

OTHER PUBLICATIONS

Extended Search Report issued Nov. 20, 2009 in European Application No. 07860105.1.
Search Reprot issued Apr. 8, 2008 in International Application No. PCT/JP2007/074876.
Office Action mailed Jul. 27, 2011, in co-pending U.S. Appl. No. 12/521,040.
Extended European Search Report issued Jun. 9, 2011, in Patent Application No. 09719203.3.

* cited by examiner

*Primary Examiner* — Robert D. Harlan
(74) *Attorney, Agent, or Firm* — Oblon, Spivak, McClelland, Maier & Neustadt, L.L.P.

(57) ABSTRACT

A fluidity improver for a PC resin that improves the melt fluidity during molding without impairing the excellent properties of the PC resin, and also yields a molded product in which external appearance defects are unlikely. The fluidity improver for an aromatic polycarbonate resin according to the present invention is including a first polymer obtained by polymerizing 0.5 to 99.5 parts by mass of a monomer first mixture including 0.5 to 99.5% by mass of styrene and 0.5 to 99.5% by mass of phenyl (meth)acrylates, in the presence of a second polymer obtained by polymerizing 0.5 to 99.5 parts by mass of a second monomer mixture containing 0.5 to 50% by mass of α-methylstyrene, 0.5 to 99% by mass of styrene and 0.5 to 99% by mass of phenyl (meth)acrylates, wherein the combined total of both monomer mixtures is 100 parts by mass.

22 Claims, 2 Drawing Sheets

FLUIDITY IMPROVER FOR AROMATIC POLYCARBONATE RESIN, PROCESS FOR PRODUCING THE FLUIDITY IMPROVER FOR AROMATIC POLYCARBONATE RESIN, AROMATIC POLYCARBONATE RESIN COMPOSITION, AND MOLDED PRODUCT

TECHNICAL FIELD

The present invention relates to a fluidity improver for an aromatic polycarbonate resin that is used for improving the melt fluidity of the aromatic polycarbonate resin during molding, a process for producing the fluidity improver, an aromatic polycarbonate resin composition containing the fluidity improver for an aromatic polycarbonate resin, and a molded product.

Priority is claimed on Japanese Patent Application No. 2008-060889, filed Mar. 11, 2008, the content of which is incorporated herein by reference.

BACKGROUND ART

Aromatic polycarbonate resins (hereinafter abbreviated as "PC resin") exhibit excellent heat resistance, mechanical properties, electrical properties and dimensional stability and the like, and are therefore widely used in all manner of fields, including within automobile members, OA (office automation) equipment, information and telecommunication equipment, electrical and electronic instruments, and household electrical appliances and the like. However, because these PC resins are usually amorphous, the molding temperature tends to be high, meaning the resins suffer from poor melt fluidity.

In recent years, molded products within the applications listed above have become increasingly larger, thinner and more complex in shape, and as a result, there are considerable demands for improvements in the melt fluidity of PC resins during molding.

Patent Document 1 proposes, as a method of improving the melt fluidity of a PC resin during molding without impairing the excellent properties (such as the heat resistance and mechanical properties) of the resin, a method in which a copolymer of styrene and phenyl methacrylate is used as a fluidity improver and added to the PC resin. However, although this method improves the melt fluidity of the PC resin, the heat resistance of the copolymer of styrene and phenyl methacrylate is not high enough. As a result, if this copolymer is added to a highly heat-resistant PC resin with the objective of improving the melt fluidity, then there is a possibility that the heat resistance of the highly heat-resistant PC resin may decrease significantly.

Patent Document 2 proposes, as a method of improving the melt fluidity of a highly heat-resistant PC resin without reducing the heat resistance of the PC resin, a method in which a copolymer of styrene, α-methylstyrene and phenyl methacrylate is used as a fluidity improver and added to the PC resin. This method improves the melt fluidity of the highly heat-resistant PC resin, and causes no reduction in the heat resistance. However, because α-methylstyrene exhibits poor polymerizability, residual monomer tends to be readily retained within the copolymer, and this can generate silver streaks during molding, resulting in external appearance defects within the molded product.
[Patent Document 1]
International Publication No. 2005/030819 pamphlet
[Patent Document 2]
Japanese Laid-Open Patent Application No. 2006-306958

DISCLOSURE OF INVENTION

Problems to be Solved by the Invention

As a result of intensive investigation, the inventors of the present invention discovered that by using a fluidity improver formed from a polymer obtained by polymerizing a monomer mixture containing styrene and the like, in the presence of a polymer obtained by polymerizing a monomer mixture containing α-methylstyrene and the like, the melt fluidity during molding of a PC resin could be improved without impairing the excellent properties (such as the heat resistance and mechanical properties) of the PC resin, and particularly a highly heat-resistant PC resin, and furthermore, external appearance defects within the resulting molded product were unlikely.

Means to Solve the Problems

In other words, the present invention includes the aspects described below.

[1] A fluidity improver for a PC resin including a polymer (X) obtained by polymerizing 0.5 to 99.5 parts by mass of a monomer mixture (b) containing 0.5 to 99.5% by mass of styrene (b1) and 0.5 to 99.5% by mass of phenyl (meth)acrylates (b2),
in the presence of a polymer (A) obtained by polymerizing 0.5 to 99.5 parts by mass of a monomer mixture (a) containing 0.5 to 50% by mass of α-methylstyrene (a1), 0.5 to 99% by mass of styrene (a2) and 0.5 to 99% by mass of phenyl (meth)acrylates (a3) (wherein the combined total of (a) and (b) is 100 parts by mass).

[2] The fluidity improver for a PC resin according to [1] above, wherein the polymerization rate of the polymer (X) is not less than 95% by mass.

[3] A method of producing a fluidity improver for a PC resin, including:
a first step of obtaining a polymer (A) by polymerizing 0.5 to 99.5 parts by mass of a monomer mixture (a) including 0.5 to 50% by mass of α-methylstyrene (a1), 0.5 to 99% by mass of styrene (a2) and 0.5 to 99% by mass of phenyl (meth)acrylates (a3), and
a second step of polymerizing 0.5 to 99.5 parts by mass of a monomer mixture (b) including 0.5 to 99.5% by mass of styrene (b1) and 0.5 to 99.5% by mass of phenyl (meth)acrylates (b2) in the presence of the polymer (A) (wherein the combined total of (a) and (b) is 100 parts by mass).

[4] The method of producing a fluidity improver for a PC resin according to [3] above, wherein the second step is halted once the polymerization rate has reached at least 95% by mass.

[5] A PC resin composition, including 0.1 to 30% by mass of the fluidity improver for a PC resin according to either [1] or [2] above, and 70 to 99.9% by mass of a PC resin.

[6] A PC resin composition, including 0.1 to 30% by mass of the fluidity improver for a PC resin according to either [1] or [2] above, 0.01 to 5% by mass of a polytetrafluoroethylene, and 65 to 99.89% by mass of a PC resin.

[7] A molded product obtained by molding the PC resin composition according to [5] or [6] above.

[8] A molded product according to [7] above, which is used as a lamp fitting component for a vehicle.

[9] A molded product according to [7] above, which is used as an extension reflector.

Effect of the Invention

According to a fluidity improver for a PC resin of the present invention, the melt fluidity during molding of a PC resin can be improved without impairing the excellent properties (such as the heat resistance and mechanical properties) of the PC resin, and particularly a highly heat-resistant PC resin, and furthermore, external appearance defects within the resulting molded product are unlikely.

According to a process for producing a fluidity improver for a PC resin of the present invention, the above type of fluidity improver for a PC resin can be produced relatively easily.

A PC resin composition of the present invention exhibits excellent melt fluidity during molding, and is capable of producing a molded product with excellent external appearance that loses none of the excellent properties (such as heat resistance and mechanical properties) of the PC resin, and particularly a highly heat-resistant PC resin.

A molded product of the present invention loses none of the excellent properties (such as heat resistance and mechanical properties) of the PC resin, and particularly a highly heat-resistant PC resin, and also exhibits superior external appearance.

A lamp fitting component for a vehicle according to the present invention, exhibits excellent heat resistance and mechanical properties.

DESCRIPTION OF THE REFERENCE SYMBOLS

Figure 1:
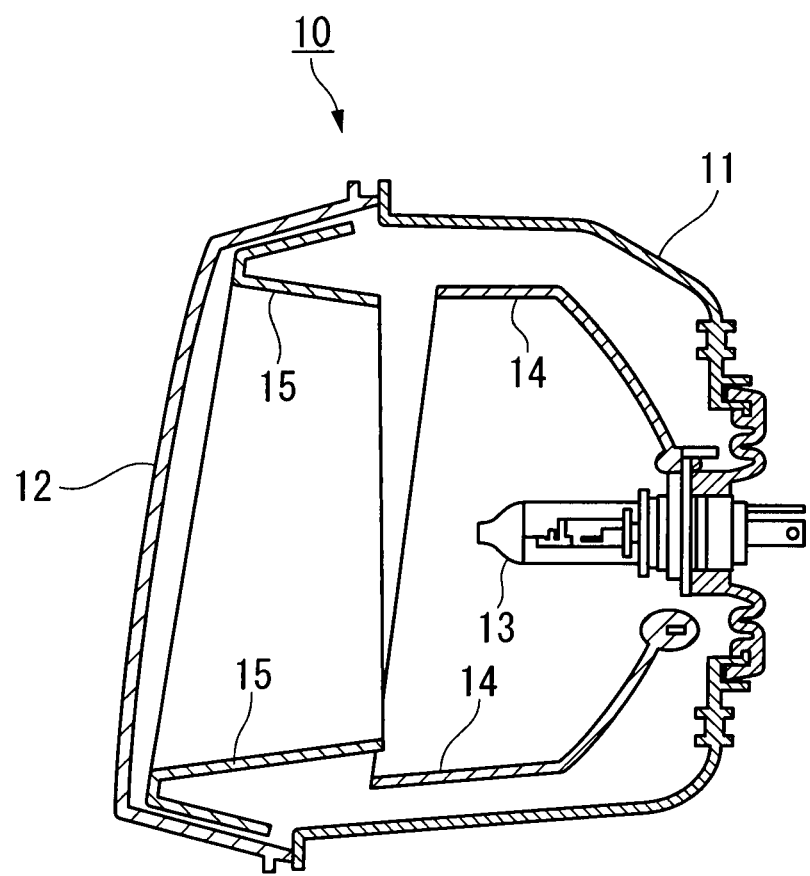
FIG. 1 is a cross-sectional view illustrating an embodiment of a lamp fitting component for a vehicle that uses a molded product of the present invention.

10: Vehicle headlamp
11: Lamp body
12: Front surface lens
13: Light source
14: Reflector
15: Extension reflector

BEST MODE FOR CARRYING OUT THE INVENTION

A more detailed description of the present invention is presented below.

A fluidity improver for a PC resin according to the present invention (hereinafter abbreviated as "the fluidity improver") is formed from a polymer (X) obtained by polymerizing a monomer mixture (b) in the presence of a polymer (A) obtained by polymerizing a monomer mixture (a).

Specifically, the fluidity improver of the present invention is a polymer obtained in a production process that includes a first step of obtaining the polymer (A) by polymerizing the monomer mixture (a), and a second step of obtaining the polymer (X) by polymerizing the monomer mixture (b) in the presence of the polymer (A).

The description "polymerizing the monomer mixture (b) in the presence of the polymer (A)" used in the second step means that after obtaining the polymer (A) by polymerizing the monomer mixture (a), the monomer mixture (b) is polymerized in the presence of the polymer (A) without isolating or purifying the polymer (A).

Accordingly, those monomers that did not react in the first step also undergo polymerization in the second step, and therefore any unreacted α-methylstyrene that is left following the first step undergoes copolymerization with the monomer mixture (b) during the second step.

The monomer mixture (a) contains α-methylstyrene (a1), styrene (a2) and phenyl (meth)acrylates (a3).

The phenyl (meth)acrylates (a3) in the monomer mixture (a) may be either a phenyl (meth)acrylate having one or more substituents on the phenyl group or a phenyl (meth)acrylate having no substituents on the phenyl group.

Specific examples of the phenyl (meth)acrylates (a3) include phenyl (meth)acrylate, 4-t-butylphenyl (meth)acrylate, bromophenyl (meth)acrylate, dibromophenyl (meth)acrylate, 2,4,6-tribromophenyl (meth)acrylate, monochlorophenyl (meth)acrylate, dichlorophenyl (meth)acrylate, and trichlorophenyl (meth)acrylate. Any one of these monomers may be used alone, or two or more monomers may be used in combination.

Of the above monomers, in terms of achieving good compatibility with the PC resin and suppressing any deterioration in the surface layer peeling resistance of the molded product, phenyl (meth)acrylate is preferred.

In the present invention, the term "(meth)acrylate" means acrylate or methacrylate.

Within the monomer mixture (a) (100% by mass), the amount of the α-methylstyrene (a1) is within a range from 0.5 to 50% by mass, the amount of the styrene (a2) is within a range from 0.5 to 99% by mass, and the amount of the phenyl (meth)acrylates (a3) is within a range from 0.5 to 99% by mass.

The lower limit for the amount of (a1) within the monomer mixture (a) (100% by mass) is preferably not less than 5% by mass, and more preferably 10% by mass or greater. The upper limit for the amount of (a1) within the monomer mixture (a) (100% by mass) is preferably not more than 40% by mass, and more preferably 30% by mass or less.

The lower limit for the amount of (a2) within the monomer mixture (a) (100% by mass) is preferably not less than 20% by mass, and more preferably 40% by mass or greater. The upper limit for the amount of (a2) within the monomer mixture (a) (100% by mass) is preferably not more than 80% by mass, and more preferably 70% by mass or less.

The lower limit for the amount of (a3) within the monomer mixture (a) (100% by mass) is preferably not less than 5% by mass, and more preferably 10% by mass or greater. The upper limit for the amount of (a3) within the monomer mixture (a) (100% by mass) is preferably not more than 40% by mass, and more preferably 30% by mass or less.

Provided the amount of the α-methylstyrene (a1) within the monomer mixture (a) (100% by mass) is at least 0.5% by mass, any reduction in the heat resistance of the obtained molded product can be prevented. Provided the amount of (a1) within the monomer mixture (a) (100% by mass) is not more than 50% by mass, the copolymerizability is favorable, and the polymerization rate of the polymer (X) is unlikely to decrease.

Provided the amount of the styrene (a2) within the monomer mixture (a) (100% by mass) is at least 0.5% by mass, the copolymerizability is favorable, and satisfactory melt fluidity can be achieved during molding. Provided the amount of (a2) within the monomer mixture (a) (100% by mass) is not more than 99% by mass, the obtained molded product is less likely to suffer any deterioration in the surface layer peeling resistance or the mechanical properties.

Provided the amount of the phenyl (meth)acrylates (a3) within the monomer mixture (a) (100% by mass) is at least 0.5% by mass, the obtained molded product is less likely to suffer any deterioration in the surface layer peeling resistance or the mechanical properties. Provided the amount of (a3) within the monomer mixture (a) (100% by mass) is not more than 99% by mass, satisfactory melt fluidity can be achieved during molding.

If required, the monomer mixture (a) may include another monomer (a4) besides the monomers (a1) to (a3) described above.

Examples of this other monomer (a4) include aromatic vinyl monomers such as p-methylstyrene, p-t-butylstyrene, p-methoxystyrene, 2,4-dimethylstyrene, chlorostyrene, bromostyrene, vinylnaphthalene and vinylanthracene; (meth)acrylate esters such as methyl (meth)acrylate, ethyl (meth)acrylate, butyl (meth)acrylate, cyclohexyl (meth)acrylate, benzyl (meth)acrylate, isobornyl (meth)acrylate and t-butylcyclohexyl (meth)acrylate; (meth)acrylic acid; (meth)acrylate esters having a reactive functional group such as 2-hydroxyethyl (meth)acrylate, glycidyl (meth)acrylate and 2-methacryloyloxyethyl phthalate; as well as vinyl benzoate, vinyl acetate, maleic anhydride, N-phenylmaleimide, cyclohexylmaleimide, allyl (meth)acrylate and divinylbenzene. Any one of these monomers may be used alone, or two or more monomers may be used in combination.

Of these monomers, methyl methacrylate is preferred.

The amount of the other monomer (a4) within the monomer mixture (a) (100% by mass) is preferably within a range from 0 to 50% by mass. The upper limit for the amount of (a4) within the monomer mixture (a) (100% by mass) is preferably not more than 20% by mass, and more preferably 10% by mass or less.

Provided the amount of (a4) within the monomer mixture (a) (100% by mass) is not more than 50% by mass, the obtained molded product is less likely to suffer any deterioration in the surface layer peeling resistance or the mechanical properties.

The monomer mixture (b) contains styrene (b1) and phenyl (meth)acrylates (b2).

As the phenyl (meth)acrylates (b2), the same monomers as those described above for (a3) can be used. As (b2), a single monomer may be used alone, or two or more monomers may be used in combination.

Of the possible monomers for (b2), in terms of achieving good compatibility with the PC resin and better suppressing any deterioration in the surface layer peeling resistance of the molded product, phenyl (meth)acrylate is preferred.

Within the monomer mixture (b) (100% by mass), the amount of the styrene (b1) is within a range from 0.5 to 99.5% by mass, and the amount of the phenyl (meth)acrylates (b2) is within a range from 0.5 to 99.5% by mass.

The lower limit for the amount of (b1) within the monomer mixture (b) (100% by mass) is preferably not less than 20% by mass, and more preferably 30% by mass or greater. The upper limit for the amount of (b1) within the monomer mixture (b) (100% by mass) is preferably not more than 80% by mass, and more preferably 60% by mass or less.

The lower limit for the amount of (b2) within the monomer mixture (b) (100% by mass) is preferably not less than 20% by mass, and more preferably 40% by mass or greater. The upper limit for the amount of (b2) within the monomer mixture (b) (100% by mass) is preferably not more than 80% by mass, and more preferably 70% by mass or less.

Provided the amount of the styrene (b1) within the monomer mixture (b) (100% by mass) is at least 0.5% by mass, satisfactory melt fluidity can be achieved during molding. Provided the amount of (b1) within the monomer mixture (b) (100% by mass) is not more than 99.5% by mass, the obtained molded product is less likely to suffer any deterioration in the surface layer peeling resistance or the mechanical properties.

Provided the amount of the phenyl (meth)acrylates (b2) within the monomer mixture (b) (100% by mass) is at least 0.5% by mass, the obtained molded product is less likely to suffer any deterioration in the surface layer peeling resistance or the mechanical properties. Provided the amount of (b2) within the monomer mixture (a) (100% by mass) is not more than 99.5% by mass, satisfactory melt fluidity can be achieved during molding.

If required, the monomer mixture (b) may include another monomer (b3) besides the monomers (b1) to (b2).

As this other monomer (b3), the same monomers as those listed above for (a4) may be used. As (b3), a single monomer may be used alone, or two or more monomers may be used in combination.

Of these monomers for (b3), methyl methacrylate and allyl methacrylate are preferred.

The amount of the other monomer (b3) within the monomer mixture (b) (100% by mass) is preferably within a range from 0 to 50% by mass. The upper limit for the amount of (b3) within the monomer mixture (b) (100% by mass) is preferably not more than 35% by mass, and more preferably 20% by mass or less.

Provided the amount of (b3) within the monomer mixture (b) (100% by mass) is not more than 50% by mass, the obtained molded product is less likely to suffer any deterioration in the surface layer peeling resistance or the mechanical properties.

The amount of the monomer mixture (a) in the first step is within a range from 0.5 to 99.5 parts by mass, and the amount of the monomer mixture (b) in the second step is within a range from 0.5 to 99.5 parts by mass (provided that the combined total of (a) and (b) is 100 parts by mass).

The lower limit for the amount of (a) is preferably not less than 40 parts by mass. The upper limit for the amount of (a) is preferably not more than 90 parts by mass.

The lower limit for the amount of (b) is preferably not less than 10 parts by mass. The upper limit for the amount of (a) is preferably not more than 60 parts by mass.

Provided the amount of (a) relative to the combined total of 100 parts by mass of the monomer mixture (a) and the monomer mixture (b) is at least 0.5 parts by mass, the heat resistance of the obtained molded product is favorable. Provided the amount of (a) is not more than 99.5 parts by mass, the generation of silver streaks during molding can be suppressed, enabling the resulting molded product to be formed with a favorable external appearance.

Provided the amount of (b) relative to the combined total of 100 parts by mass of the monomer mixture (a) and the monomer mixture (b) is at least 0.5 parts by mass, the generation of silver streaks during molding can be suppressed, enabling the resulting molded product to be formed with a favorable external appearance. Provided the amount of (b) is not more than 99.5 parts by mass, the obtained molded product is unlikely to suffer any deterioration in the surface layer peeling resistance or the mechanical properties.

Examples of the polymerization method used in the production process of the present invention include emulsion polymerization methods, suspension polymerization methods, solution polymerization methods and bulk polymerization methods. Of these, an emulsion polymerization method is preferred, as it enables the polymerization of the monomer mixture (b) in the presence of the polymer (A) obtained by polymerizing the monomer mixture (a) to be conducted with relative ease.

As this emulsion method, conventional methods may be employed, although if residual salts remain within the obtained polymer, then there is a possibility that these salts may cause thermal degradation of the PC resin. Accordingly, a method using a anionic emulsifier such as a carboxylate emulsifier or a phosphate ester, in which the polymer is collected by salting-out aggregation using calcium acetate or the like is preferred.

Examples of the polymerization initiator include: organic peroxides; persulfates; redox initiators formed from a combination of a reducing agent and either an organic peroxide or a persulfate; and azo compounds.

The second step in the production process of the present invention may be either started once the polymerization rate of the first step has reached 100% by mass, or started before the polymerization rate reaches 100% by mass, but is preferably started once the polymerization rate has reached at least 90% by mass.

Provided the second step is started once the polymerization rate in the first step has reached at least 90% by mass, any residual α-methylstyrene that did not react during the first step is able to undergo thorough copolymerization with the monomer mixture (b), meaning the amount of residual α-methylstyrene within the polymer (X) can be reduced.

The second step is preferably halted once the polymerization rate has reached at least 95% by mass, and is more preferably halted once the polymerization rate has reached 99% by mass or more.

Provided the second step is halted once the polymerization rate has reached at least 95% by mass, the composition ratio (% by mass) between the monomers within the monomer mixture, and the composition ratio (% by mass) between the corresponding monomer units within the polymer (X) are substantially identical, enabling a polymer of the desired composition to be obtained with comparative ease.

Furthermore, provided the second step is halted once the polymerization rate has reached at least 95% by mass, the total amount of residual α-methylstyrene and residual styrene and the like within the polymer (X) is not more than 5% by mass, and therefore the occurrence of peeling, swelling or silver streaking during molding can be better suppressed, enabling the external appearance of the obtained molded product to be improved.

For similar reasons, the polymerization rate of the polymer (X) is preferably 95% by mass or greater, and more preferably 99% by mass or greater.

The weight average molecular weight of the obtained polymer (X) is preferably within a range from 5,000 to 200,000.

The lower limit for the weight average molecular weight of the polymer (X) is more preferably 10,000 or higher, and still more preferably 30,000 or higher. The upper limit for the weight average molecular weight of the polymer (X) is more preferably not more than 150,000, and still more preferably 100,000 or less.

Provided the weight average molecular weight of the polymer (X) is at least 5,000, the amount of comparatively low molecular weight materials is reduced, and therefore any deterioration in the heat resistance or mechanical properties of the obtained molded product can be prevented. Further, smoke generation, mist, instrument soiling and the occurrence of fish eyes or silver streaks during molding can be suppressed. Provided the weight average molecular weight of the polymer (X) is not more than 200,000, the melt fluidity during molding can be further improved.

The molecular weight distribution (weight average molecular weight (Mw)/number average molecular weight (Mn)) of the polymer (X) is preferably not more than 4.0, and more preferably 3.0 or less.

Provided the molecular weight distribution of the polymer (X) is not more than 4.0, the melt viscosity does not increase significantly, and the melt fluidity during molding can be further improved.

The polymer (X) exhibits phase separation behavior relative to the PC resin during melt molding, and within the usable temperature range for the molded product, exhibits sufficient co-solubility (affinity) with the PC resin to achieve favorable surface layer peeling resistance. By using this type of polymer (X) as a fluidity improver, and blending the polymer with a PC resin, and particularly a highly heat-resistant PC resin, the melt fluidity of the resulting PC resin composition during molding can be improved without significantly impairing the heat resistance or mechanical properties of the PC resin. Furthermore, by using the polymer (X) as a fluidity improver, the occurrence of silver streaks during molding can be suppressed, meaning the external appearance of the obtained molded product can be improved.

A PC resin composition of the present invention contains the fluidity improver described above and a PC resin.

The PC resin can be obtained by reacting a carbonate precursor with a diphenol.

Examples of the diphenol include 2,2-bis(4-hydroxyphenyl)propane (hereinafter referred to as "bisphenol A"), 2,2-bis(3,5-dibromo-4-hydroxyphenyl)propane, 2,2-bis(3,5-dimethyl-4-hydroxyphenyl)propane, 1,1-bis(4-hydroxyphenyl)cyclohexane, 1,1-bis(4-hydroxyphenyl)-3,3,5-trimethylcyclohexane (hereinafter referred to as "bisphenol TMC"), 1,1-bis(3,5-dimethyl-4-hydroxyphenyl)cyclohexane, 1,1-bis(4-hydroxyphenyl)cyclodecane, 1,1-bis(4-hydroxyphenyl)cyclododecane, 1,1-bis(3,5-dimethyl-4-hydroxyphenyl)cyclododecane, 4,4'-dihydroxydiphenyl ether, 4,4'-thiodiphenol, and 4,4'-dihydroxy-3,3'-dichlorodiphenyl ether.

Further, examples of the carbonate precursor that is used for introducing carbonate groups include phosgene and diphenyl carbonate.

A single PC resin may be used alone, or two or more resins may be used in combination.

Of the various PC resins, APEC 1800 (manufactured by Bayer AG), which is a copolymer of bisphenol A and bisphenol TMC, is preferred as it exhibits a high degree of heat resistance.

The molecular weight of the PC resin, reported as a viscosity average molecular weight calculated from the solution viscosity measured at a temperature of 25° C. using methylene chloride as the solvent, is preferably within a range from 14,000 to 40,000, more preferably from 16,000 to 30,000, and still more preferably from 18,000 to 26,000.

In the PC resin composition of the present invention, the amount of the fluidity improver is within a range from 0.1 to 30% by mass, and the amount of the PC resin is within a range from 70 to 99.9% by mass.

The lower limit for the amount of the fluidity improver within the PC resin composition (100% by mass) is preferably not less than 1% by mass, and more preferably 5% by mass or greater. The upper limit for the amount of the fluidity improver within the PC resin composition (100% by mass) is preferably not more than 25% by mass, and more preferably 20% by mass or less.

The lower limit for the amount of the PC resin within the PC resin composition (100% by mass) is preferably not less than 75% by mass, and more preferably 80% by mass or greater. The upper limit for the amount of the PC resin within the PC resin composition (100% by mass) is preferably not more than 99% by mass, and more preferably 95% by mass or less.

Provided the amount of the fluidity improver within the PC resin composition (100% by mass) is at least 0.1% by mass, a satisfactory level of melt fluidity is achieved during molding.

Provided the amount of the fluidity improver within the PC resin composition (100% by mass) is not more than 30% by mass, the excellent properties (such as heat resistance and mechanical properties) of the PC resin, and particularly a highly heat-resistant PC resin, are less likely to be impaired.

Provided the amount of the PC resin within the PC resin composition (100% by mass) is at least 70% by mass, the excellent properties (such as heat resistance and mechanical properties) of the PC resin, and particularly a highly heat-resistant PC resin, are less likely to be impaired.

Provided the amount of the PC resin within the PC resin composition (100% by mass) is not more than 99.9% by mass, a satisfactory level of melt fluidity is achieved during molding.

The PC resin composition of the present invention preferably also includes a polytetrafluoroethylene. The polytetrafluoroethylene (hereinafter abbreviated as "PTFE") may be either a PTFE homopolymer or a mixed-state PTFE. Of these, a mixed-state PTFE is preferred in terms of achieving favorable dispersibility within the PC resin, and a PTFE-containing mixed powder formed from PTFE particles and an organic polymer is particularly preferred.

As the PTFE-containing mixed powder, a powder obtained by mixing an aqueous dispersion of PTFE particles having a weight average particle size of 0.05 to 1.0 μm and an aqueous dispersion of organic polymer particles, and then powdering the resulting mixture by aggregation or spray drying; a powder obtained by polymerizing a monomer that constitutes an organic polymer in the presence of an aqueous dispersion of PTFE particles having a weight average particle size of 0.05 to 1.0 μm, and then powdering the resulting product by aggregation or spray drying; or a powder obtained by polymerizing a monomer that constitutes an organic polymer within a dispersion prepared by mixing an aqueous dispersion of PTFE particles having a weight average particle size of 0.05 to 1.0 μm and an aqueous dispersion of organic polymer particles, and then powdering the resulting product by aggregation or spray drying is preferred.

The organic polymer is a polymer obtained by polymerizing a vinyl monomer. Examples of this vinyl monomer include (meth)acrylate esters such as methyl (meth)acrylate, aromatic vinyl monomers such as styrene, and cyanated vinyl monomers such as (meth)acrylonitrile. Any one of these vinyl monomers may be used alone, or two or more monomers may be used in combination.

The amount of the PTFE within the PTFE-containing mixed powder (100% by mass) is preferably within a range from 10 to 90% by mass, and more preferably 20 to 80% by mass.

Specific examples of the PTFE-containing mixed powder include the products METABLEN A-3000, METABLEN A-3700, METABLEN A-3750 and METABLEN A-3800 (all manufactured by Mitsubishi Rayon Co., Ltd.).

In those cases where a PTFE is included, the amount of the fluidity improver in the PC resin composition of the present invention is within a range from 0.1 to 30% by mass, the amount of the PTFE is within a range from 0.01 to 5% by mass, and the amount of the PC resin is within a range from 65 to 99.89% by mass.

In those cases where a PTFE-containing mixed powder is used as the PTFE, the powder is used in an amount that yields an amount of the PTFE within the PC resin composition of the present invention of 0.01 to 5% by mass.

The lower limit for the amount of the PTFE within the PC resin composition (100% by mass) is preferably not less than 0.05% by mass, and is more preferably 0.15% by mass or greater. The upper limit for the amount of the PTFE within the PC resin composition (100% by mass) is preferably not more than 0.5% by mass, and more preferably 0.35% by mass or less.

Provided the amount of the PTFE within the PC resin composition (100% by mass) is at least 0.01% by mass, the generation of flow marks during molding can be suppressed.

Provided the amount of the PTFE within the PC resin composition (100% by mass) is not more than 5% by mass, it is unlikely to cause any reduction in the melt fluidity during molding.

The PC resin composition of the present invention may include other resins and elastomers, provided they are included in an amount that does not impair the excellent properties (such as the heat resistance and mechanical properties) of the PC resin, and particularly a highly heat-resistant PC resin, specifically in an amount of not more than 50 parts by mass relative to 100 parts by mass of the PC resin.

Examples of these other resins include styrene-based resins such as polystyrene (PSt), styrene-based random copolymers (such as acrylonitrile-styrene resins (AS resins)), alternating copolymers of styrene and maleic anhydride, graft copolymers (such as acrylonitrile-butadiene-styrene resins (ABS resins), acrylonitrile-ethylene/propylene rubber-styrene resins (AES resins) and acrylonitrile-acrylate-styrene resins (AAS resins)); polyesters such as polyethylene terephthalate (PET), polybutylene terephthalate (PBT) and PET/PBT copolymers; acrylic resins such as poly(methyl methacrylate) (PMMA) and methyl methacrylate copolymers; olefin-based resins such as polypropylene (PP), polyethylene (PE) and ethylene-(meth)acrylic acid copolymers; polyurethanes; silicone resins; polyamides such as 6-nylon and 6,6-nylon; polyarylates; polyphenylene sulfides; polyetherketones; polysulfones; polyethersulfone polyamideimides; and polyacetals.

Examples of the elastomers include isobutylene-isoprene rubbers; polyester-based elastomers; styrene-based elastomers such as styrene-butadiene rubbers, polystyrene-polybutadiene-polystyrene (SBS), polystyrene-poly(ethylene-butylene)-polystyrene (SEBS), polystyrene-polyisoprene-polystyrene (SIS) and polystyrene-poly(ethylene-propylene)-polystyrene (SEPS); polyolefin-based elastomers such as ethylene-propylene rubbers; polyamide-based elastomers; acrylic elastomers; graft copolymers containing diene-based rubbers, acrylic rubbers or silicone-based rubbers or the like; and methyl methacrylate-acrylonitrile-styrene resins (MAS resins).

Furthermore, if necessary, the PC resin composition of the present invention may also include any of the various types of stabilizers such as conventional ultraviolet absorbers, photostabilizers, antioxidants and thermal stabilizers, as well as conventional additives such as reinforcing agents, inorganic fillers, mold release agents, antistatic agents, bluing agents and flame retardants.

Examples of the reinforcing agents include glass fiber, carbon fiber and potassium titanate fiber.

Examples of the inorganic fillers include talc, mica and calcium carbonate.

The PC resin composition of the present invention can be prepared by mixing the fluidity improver and the PC resin, and where necessary the PTFE, the other resins or elastomers, and the additives.

The blending of the raw materials may be performed in a single stage, or performed across two or more separate stages. In one example of a method of performing the blending across two stages, a portion of the PC resin and the other raw materials are blended together to prepare a master batch, and this master batch is then blended with the remaining PC resin.

During mixing, a tumbler, V-type blender, super mixer, Nauta mixer, Banbury mixer, kneading roller, or extruder or the like may be used.

A molded product of the present invention is a product obtained by molding the PC resin composition described above. The molded product is obtained by using any of the various molding methods to mold the PC resin composition, either directly or following processing of the PC resin composition into pellets.

Examples of the molding method include injection molding methods, extrusion molding methods, compression molding methods, blow molding methods and cast molding methods, but of these, injection molding methods are preferred.

Because molded products of the present invention exhibit the excellent properties (such as heat resistance and mechanical properties) of PC resins, and particularly highly heat-resistant PC resins, and can be used for products that are larger, thinner and more complex in shape, they are useful as members in all manner of different fields, including within automobile members, OA equipment, information and telecommunication equipment, electrical and electronic instruments, and household electrical appliances and the like.

In the field of automobile members, a molded product of the present invention can be used particularly favorably as an extension reflector of a lamp fitting component for a vehicle. In particular, a molded product obtained by molding a PC resin composition of the present invention offers the advantage that an extension reflector can be obtained by direct vapor deposition without an undercoat layer.

One embodiment of a lamp fitting component for a vehicle that uses a molded product of the present invention is described below.

The lamp fitting component of this embodiment is a vehicle headlamp 10 such as that illustrated in FIG. 1, and includes a lamp body 11, a front surface lens 12, a light source 13 that is attached to the lamp body 11 and faces the front surface lens 12, a reflector 14 that reflects the light emitted from the light source 13 towards the front surface lens 12, and an extension reflector 15 that is attached to the front surface lens 12.

A reflective surface composed of aluminum or the like is formed on the surfaces of the reflector 14 and the extension reflector 15, either by vapor deposition on top of an undercoat layer, or by direct vapor deposition with no undercoat layer. As a result, the light is reflected off these surfaces with a high degree of reflectance.

The extension reflector 15 in this embodiment is a molded product of the PC resin composition described above, and therefore exhibits excellent heat resistance and mechanical properties. As a result, the lamp fitting component also exhibits excellent heat resistance and mechanical properties.

EXAMPLES

The present invention is described in more detail below based on a series of example, although the present invention is in no way limited by these examples.

In the following examples and comparative examples, the units "parts" and "%" refer to "parts by mass" and "% by mass" respectively.

Further, the polymerization rates and average molecular weights reported in the examples below were measured using the methods described below.

(1) Polymerization Rate

The polymerization rate at the completion of the second step was measured using the procedure outlined below.

(i) The mass (x) of an aluminum dish was measured in 0.1 mg units.

(ii) Approximately 1 g of a latex of the polymer (X) was placed in the aluminum dish, and the mass (y) of the aluminum dish containing the latex of the polymer (X) was measured in 0.1 mg units.

(iii) The aluminum dish containing the latex of the polymer (X) was placed inside a 180° C. dryer, and heated for 45 minutes.

(iv) The aluminum dish was removed from the dryer and cooled to room temperature in a desiccator, and the mass (z) was then measured in 0.1 mg units.

(v) Based on the formula below, the solid fraction concentration of the latex of the polymer (X) was calculated.

$$\text{Solid fraction concentration}(\%) = \{(z-x)/(y-x)\} \times 100$$

(vi) The percentage (%) of the solid fraction concentration calculated in (v) relative to the solid fraction concentration when all the monomers used in the production of the polymer (X) are subjected to polymerization was then recorded as the polymerization rate at the completion of the second step.

(2) Weight Average Molecular Weight (Mw), Number Molecular Weight (Mn)

Using gel permeation chromatography, and the apparatus and measurement conditions listed below, a calibration curve prepared using standard polystyrenes was used to measure Mw and Mn for the polymer (X).

Column: TSK-GEL SUPER HZM-N, manufactured by Tosoh Corporation

Measurement temperature: 40° C.

Eluent: Chloroform

Elution rate: 0.6 ml/minute

Detector: Refractometer (RI)

Example 1

Production of Polymer (X-1)

A separable flask fitted with a thermometer, a nitrogen inlet tube, a cooling tube and a stirrer was charged with the emulsifier mixture listed below, and with constant stirring under an atmosphere of nitrogen, the temperature inside the separable flask was raised to 60° C.

Emulsifier mixture:
EMAL 20C (anionic emulsifier, manufactured by Kao Corporation) 5.0 parts
Ion-exchanged water 300 parts Subsequently, the reducing agent mixture listed below was added to the separable flask.

Reducing agent mixture:
Ferrous sulfate 0.0001 parts
Disodium ethylenediaminetetraacetate 0.0003 parts
Rongalite 0.3 parts
Ion-exchanged water 5 parts Subsequently, the monomer mixture (a), chain transfer agent and polymerization initiator listed below were mixed together, and the resulting mixture was added dropwise to the separable flask over a period of 180 minutes. Following completion of the dropwise addition, the reaction mixture was stirred for a further 15 minutes. This process resulted in the polymerization of the monomer mixture (a).
Monomer mixture (a):
α-methylstyrene 10.0 parts
Styrene 30.0 parts
Phenyl methacrylate 10.0 parts
Chain transfer agent:
n-octyl mercaptan 0.25 parts
Polymerization initiator:
t-butyl hydroperoxide 0.1 parts Next, the monomer mixture (b), chain transfer agent and polymerization initiator listed below were mixed together, and the resulting mixture was added dropwise to the separable flask over a period of 240 minutes. Following completion of the dropwise addition, the internal temperature was raised to 80° C. and stirring was continued for 60 minutes to complete the polymerization. The polymerization rate was 100%.

This process yielded a latex of a polymer (X-1).
Monomer mixture (b):
Styrene 20.0 parts
Phenyl methacrylate 30.0 parts
Chain transfer agent:
n-octyl mercaptan 0.25 parts
Polymerization initiator:
t-butyl hydroperoxide 0.1 parts The internal temperature of the separable flask was cooled to 50° C., 0.8 parts of PELEX SS-L (an anionic emulsifier, manufactured by Kao Corporation) was added, and 6 parts of IRGASTAB MBS43EM (manufactured by Ciba Japan K.K.) was then added.

625 parts of an aqueous solution containing 5 parts of dissolved calcium acetate was heated to 91° C. with stirring. The obtained latex of the polymer (X-1) was then gradually added dropwise to this heated aqueous solution, and following completion of the dropwise addition, the mixture was heated to 95° C. and held at that temperature for 5 minutes to aggregate the latex of the polymer (X-1).

The thus obtained aggregate was subjected to a solid-liquid separation, and after washing, was dried for 24 hours at 75° C., yielding a polymer (X-1).

For the polymer (X-1), Mw was 45,000, Mn was 16,500, and the molecular weight distribution (Mw/Mn) was 2.7.

The units for the monomer composition described above were "parts", but these values have been converted to "%" for presentation in Table 1.

Example 2

Production of Polymer (X-2)

With the exceptions of altering the composition of the monomer mixture (b), the chain transfer agent and the polymerization initiator in the manner outlined below, the same procedure as example 1 was used to produce a polymer (X-2).
Monomer mixture (b):
Styrene 20.0 parts
Phenyl methacrylate 29.75 parts
Allyl methacrylate 0.25 parts
Chain transfer agent:
n-octyl mercaptan 0.375 parts
Polymerization initiator:
t-butyl hydroperoxide 0.1 parts The polymerization rate in the production of the polymer (X-2) was 100%, and for the obtained polymer (X-2), Mw was 43,000, Mn was 16,500, and the molecular weight distribution (Mw/Mn) was 2.6.

Example 3

Production of Polymer (X-3)

A separable flask fitted with a thermometer, a nitrogen inlet tube, a cooling tube and a stirrer was charged with the emulsifier mixture listed below, and with constant stirring under an atmosphere of nitrogen, the temperature inside the separable flask was raised to 60° C.
Emulsifier mixture:
PELEX SS-L (anionic emulsifier, manufactured by Kao Corporation) 2.4 parts
Ion-exchanged water 295 parts Subsequently, the reducing agent mixture listed below was added to the separable flask.
Reducing agent mixture:
Ferrous sulfate 0.0001 parts
Disodium ethylenediaminetetraacetate 0.0003 parts
Rongalite 0.3 parts
Ion-exchanged water 5 parts Subsequently, the monomer mixture (a), chain transfer agent and polymerization initiator listed below were mixed together, and the resulting mixture was added dropwise to the separable flask over a period of 270 minutes. Following completion of the dropwise addition, the reaction mixture

TABLE 1

|  | | Example 1 X-1 | | Example 2 X-2 | | Example 3 X-3 | | Example 4 X-4 | | Comparative example 1 X'-5 | | Comparative example 2 X'-6 | |
|---|---|---|---|---|---|---|---|---|---|---|---|---|---|
|  | | (parts) | (%) | (parts) | (%) | (parts) | (%) | (parts) | (%) | (parts) | (%) | (parts) | (%) |
| (a) | αMeSt (a1) | 10 | 20 | 10 | 20 | 15 | 20 | 15 | 20 | — | — | 20 | 20 |
|  | St (a2) | 30 | 60 | 30 | 60 | 45 | 60 | 45 | 60 | — | — | 60 | 60 |
|  | PhMA (a3) | 10 | 20 | 10 | 20 | 15 | 20 | 7.5 | 10 | — | — | 20 | 20 |
|  | MMA (a4) | — | — | — | — | — | — | 7.5 | 10 | — | — | — | — |
| (b) | St (b1) | 20 | 40 | 20 | 40 | 10 | 40 | 10 | 40 | 60 | 60 | — | — |
|  | PhMA (b2) | 30 | 60 | 29.75 | 59.5 | 14.875 | 59.5 | 7.4375 | 29.75 | 40 | 40 | — | — |
|  | AMA (b3) | — | — | 0.25 | 0.5 | 0.125 | 0.5 | 0.125 | 0.5 | — | — | — | — |
|  | MMA (b3) | — | — | — | — | — | — | 7.4375 | 29.75 | — | — | — | — |
|  | (a)/(b) | 50/50 | | 50/50 | | 75/25 | | 75/25 | | 0/100 | | 100/0 | |

Abbreviations in table
αMeSt: α-methylstyrene
St: styrene
PhMA: phenyl methacrylate
MMA: methyl methacrylate
AMA: allyl methacrylate was stirred for a further 15 minutes. This process resulted in the polymerization of the monomer mixture (a).
Monomer mixture (a):
α-methylstyrene 15.0 parts
Styrene 45.0 parts
Phenyl methacrylate 15.0 parts
Chain transfer agent:
n-octyl mercaptan 0.4 parts
Polymerization initiator:
t-butyl hydroperoxide 0.15 parts Next, the monomer mixture (b), chain transfer agent and polymerization initiator listed below were mixed together, and the resulting mixture was added dropwise to the separable flask over a period of 180 minutes. Following completion of the dropwise addition, the internal temperature was raised to 80° C. and stirring was continued for 60 minutes to complete the polymerization.
Monomer mixture (b):
Styrene 10.0 parts
Phenyl methacrylate 14.875 parts
Allyl methacrylate 0.125 parts
Chain transfer agent:
n-octyl mercaptan 0.19 parts
Polymerization initiator:
t-butyl hydroperoxide 0.05 parts Operations from this point onward were performed in the same manner as example 1, and resulted in the production of a polymer (X-3).

The polymerization rate in the production of the polymer (X-3) was 100%, and for the obtained polymer (X-3), Mw was 45,000, Mn was 16,500, and the molecular weight distribution (Mw/Mn) was 2.7.

Example 4

Production of Polymer (X-4)

A separable flask fitted with a thermometer, a nitrogen inlet tube, a cooling tube and a stirrer was charged with the emulsifier mixture listed below, and with constant stirring under an atmosphere of nitrogen, the temperature inside the separable flask was raised to 60° C.
Emulsifier mixture:
PELEX SS-L (anionic emulsifier, manufactured by Kao Corporation) 2.4 parts
Ion-exchanged water 295 parts
Subsequently, the reducing agent mixture listed below was added to the separable flask.
Reducing agent mixture:
Ferrous sulfate 0.0001 parts
Disodium ethylenediaminetetraacetate 0.0003 parts
Rongalite 0.3 parts
Ion-exchanged water 5 parts
Subsequently, the monomer mixture (a), chain transfer agent and polymerization initiator listed below were mixed together, and the resulting mixture was added dropwise to the separable flask over a period of 270 minutes. Following completion of the dropwise addition, the reaction mixture was stirred for a further 30 minutes. This process resulted in the polymerization of the monomer mixture (a).
Monomer mixture (a):
α-methylstyrene 15.0 parts
Styrene 45.0 parts
Phenyl methacrylate 7.5 parts
Methyl methacrylate 7.5 parts
Chain transfer agent:
n-octyl mercaptan 0.4 parts
Polymerization initiator:
t-butyl hydroperoxide 0.15 parts Next, the monomer mixture (b), chain transfer agent and polymerization initiator listed below were mixed together, and the resulting mixture was added dropwise to the separable flask over a period of 90 minutes. Following completion of the dropwise addition, the internal temperature was raised to 80° C. and stirring was continued for 60 minutes to complete the polymerization.
Monomer mixture (b):
Styrene 10.0 parts
Phenyl methacrylate 7.4375 parts
Methyl methacrylate 7.4375 parts
Allyl methacrylate 0.125 parts
Chain transfer agent:
n-octyl mercaptan 0.19 parts
Polymerization initiator:
t-butyl hydroperoxide 0.05 parts Operations from this point onward were performed in the same manner as example 1, and resulted in the production of a polymer (X-4).

The polymerization rate in the production of the polymer (X-4) was 100%, and for the obtained polymer (X-4), Mw was 45,000, Mn was 16,500, and the molecular weight distribution (Mw/Mn) was 2.7.

Comparative example 1

Production of Polymer (X'-5)

A separable flask fitted with a thermometer, a nitrogen inlet tube, a cooling tube and a stirrer was charged with the emulsifier mixture listed below, and with constant stirring under an atmosphere of nitrogen, the temperature inside the separable flask was raised to 60° C.
Emulsifier mixture:
PELEX SS-L (anionic emulsifier, manufactured by Kao Corporation) 2.4 parts
Ion-exchanged water 295 parts
Subsequently, the reducing agent mixture listed below was added to the separable flask.
Reducing agent mixture:
Ferrous sulfate 0.0001 parts
Disodium ethylenediaminetetraacetate 0.0003 parts
Rongalite 0.3 parts
Ion-exchanged water 5 parts
Next, the monomer mixture (b), chain transfer agent and polymerization initiator listed below were mixed together, and the resulting mixture was added dropwise to the separable flask over a period of 180 minutes. Following completion of the dropwise addition, the internal temperature was raised to 80° C. and stirring was continued for 60 minutes to complete the polymerization.
Monomer mixture (b):
Styrene 60.0 parts
Phenyl methacrylate 40.0 parts
Chain transfer agent:
n-octyl mercaptan 0.5 parts
Polymerization initiator:
t-butyl hydroperoxide 0.2 parts Operations from this point onward were performed in the same manner as example 1, and resulted in the production of a polymer (X'-5).

The polymerization rate in the production of the polymer (X'-5) was 100%, and for the obtained polymer (X'-5), Mw was 50,000, Mn was 25,000, and the molecular weight distribution (Mw/Mn) was 2.0.

Comparative Example 2

Production of Polymer (X'-6)

A separable flask fitted with a thermometer, a nitrogen inlet tube, a cooling tube and a stirrer was charged with the emulsifier mixture listed below, and with constant stirring under an atmosphere of nitrogen, the temperature inside the separable flask was raised to 60° C.

Emulsifier mixture:
PELEX SS-L (anionic emulsifier, manufactured by Kao Corporation) 2.4 parts
Ion-exchanged water 295 parts Subsequently, the reducing agent mixture listed below was added to the separable flask.

Reducing agent mixture:
Ferrous sulfate 0.0001 parts
Disodium ethylenediaminetetraacetate 0.0003 parts
Rongalite 0.3 parts
Ion-exchanged water 5 parts Next, the monomer mixture (a), chain transfer agent and polymerization initiator listed below were mixed together, and the resulting mixture was added dropwise to the separable flask over a period of 180 minutes. Following completion of the dropwise addition, the internal temperature was raised to 80° C. and stirring was continued for 60 minutes to complete the polymerization.

Monomer mixture (a):
α-methylstyrene 20.0 parts
Styrene 60.0 parts
Phenyl methacrylate 20.0 parts
Chain transfer agent:
n-octyl mercaptan 0.5 parts
Polymerization initiator:
t-butyl hydroperoxide 0.2 parts Operations from this point onward were performed in the same manner as example 1, and resulted in the production of a polymer (X'-6).

The polymerization rate in the production of the polymer (X'-6) was 94%, and for the obtained polymer (X'-6), Mw was 50,000, Mn was 25,000, and the molecular weight distribution (Mw/Mn) was 2.0.

Examples 5 to 9, Comparative Examples 3 to 5

Using the polymers (X-1) to (X'-6) as fluidity improvers and using the blend proportions shown in Table 2, the fluidity improvers were blended with a highly heat-resistant PC resin (APEC 1800, manufactured by Bayer AG) and a PTFE-containing mixed powder (METABLEN A-3750, manufactured by Mitsubishi Rayon Co., Ltd., PTFE content: 50%).

Subsequently, 0.1 parts of IRGANOX HP2921 (manufactured by Ciba Japan K.K.) was added, and the resulting mixture was then supplied to a biaxial extruder (TEM-35, manufactured by Toshiba Machine Co., Ltd.) and subjected to melt kneading at 320° C., yielding a PC resin composition.

Using the PC resin compositions obtained in examples 5 to 9 and comparative examples 3 to 5, the evaluations described below were performed. The evaluation results are listed in Table 2.

TABLE 2

|  |  | Example 5 | Example 6 | Example 7 | Example 8 | Example 9 | Comparative example 3 | Comparative example 4 | Comparative example 5 |
|---|---|---|---|---|---|---|---|---|---|
| Polymer (X-1) |  | 15 | — | — | — | — | — | — | — |
| Polymer (X-2) |  | — | 15 | — | — | 15 | — | — | — |
| Polymer (X-3) |  | — | — | 15 | — | — | — | — | — |
| Polymer (X-4) |  | — | — | — | 15 | — | — | — | — |
| Polymer (X'-5) |  | — | — | — | — | — | 15 | — | — |
| Polymer (X'-6) |  | — | — | — | — | — | — | 15 | — |
| PTFE-containing mixed powder (A-3750) |  | — | — | — | — | 0.5 | — | — | — |
| PC resin (APEC 1800) |  | 85 | 85 | 85 | 85 | 84.5 | 85 | 85 | 100 |
| Melt fluidity | [mm] | 323 | 324 | 343 | 333 | 319 | 247 | 350 | 45 |
|  | [%] | 718 | 720 | 762 | 740 | 709 | 549 | 778 | 100 |
| Thermal deterioration | [—] | A | A | A | A | A | A | A | B |
| Surface layer peeling resistance | [—] | A | A | A | A | A | B | A | A |
| Silver streak | [—] | A | A | A | A | A | A | B | A |
| Molded product swelling | [—] | A | A | A | A | A | B | A | A |
| Temperature of deflection under load | [° C.] | 163 | 163 | 163 | 163 | 163 | 160 | 165 | 170 |
| Flexural strength | [MPa] | 72 | 74 | 75 | 75 | 75 | 77 | 78 | 71 |
| Flexural modulus | [MPa] | 2350 | 2300 | 2320 | 2320 | 2300 | 2250 | 2340 | 2200 |
| Charpy impact test | [kJ/m$^2$] | 7 | 7 | 7 | 7 | 7 | 7 | 7 | 10 |

(Melt Fluidity)

The spiral flow length (SPL) of the PC resin composition was measured using an injection molding machine (IS-100, manufactured by Toshiba Machine Co., Ltd.).

The molding conditions included a molding temperature of 320° C., a die temperature of 80° C. and an injection pressure of 50 MPa, and the resulting molded product had a thickness of 2 mm and a width of 15 mm.

(Thermal Deterioration)

The thermal deterioration of the PC resin composition was evaluated using the method described below.

Following residence of the PC resin composition for 20 minutes at 320° C. inside the cylinder of an injection molding machine (IS-100, manufactured by Toshiba Machine Co., Ltd.), the SPL of the PC resin composition was measured, and the degree of thermal deterioration was evaluated against the evaluation criteria listed below. The molding conditions during measurement of the SPL were the same as those used in the melt fluidity evaluation.

A: The SPL value following residence changed not more than 10% from the SPL value in the melt fluidity evaluation.

B: The SPL value following residence changed more than 10% from the SPL value in the melt fluidity evaluation.

The thermal deterioration functions as an indicator of the heat resistance.

(Surface Layer Peeling Resistance)

A cutter was used to insert a cut in a molded product molded under the same conditions as those used in the melt fluidity evaluation, with the cut inserted at the mark left by the ejector pin, and the level of surface layer peeling was evaluated visually. The surface layer peeling resistance was evaluated against the evaluation criteria listed below.

A: no surface layer peeling was visible.

B: some surface layer peeling was visible.

The surface layer peeling resistance functions as an indicator of the compatibility.

(Silver Streak)

Using an injection molding machine (IS-100, manufactured by Toshiba Machine Co., Ltd.), the PC resin composition was molded to obtain a molded product of length 100 mm×width 50 mm×thickness 2 mm. The external appearance of the molded product was inspected visually, and evaluated against the criteria listed below.

A: the external appearance was good, with no silver streaks observed.

B: silver streaks were observed.

(Molded Product Swelling)

Using an injection molding machine (IS-100, manufactured by Toshiba Machine Co., Ltd.), the PC resin composition was molded to obtain a molded product of length 100 mm×width 50 mm×thickness 2 mm. The thus obtained molded product was stored for 24 hours at 160° C., and the external appearance of the molded product was then inspected visually, and evaluated against the criteria listed below.

A: the external appearance was good, with no swelling.

B: swelling or surface layer peeling was observed.

(Temperature of Deflection Under Load)

The heat resistance of the molded product was evaluated on the basis of the temperature of deflection under load, which was measured under the conditions described below.

Using an injection molding machine (IS-100, manufactured by Toshiba Machine Co., Ltd.), the PC resin composition was molded to obtain a molded product of length 80 mm×width 10 mm×thickness 4 mm. The thus obtained molded product was subjected to an annealing treatment for 2 hours at 150° C., and was then used for evaluation. The temperature of deflection under load was measured in accordance with ISO 75-2, using a load of 1.82 MPa.

(Flexural Test)

Using an injection molding machine (IS-100, manufactured by Toshiba Machine Co., Ltd.), the PC resin composition was molded to obtain a molded product of length 80 mm×width 10 mm×thickness 4 mm. A flexural test of the molded product was then conducted in accordance with ISO 178, using a bending speed of 2 mm/minute.

(Charpy Impact Test)

Using an injection molding machine (IS-100, manufactured by Toshiba Machine Co., Ltd.), the PC resin composition was molded to obtain a molded product of length 80 mm×width 10 mm×thickness 4 mm. The Charpy impact test was conducted in accordance with ISO 179-1, and was measured by carving a type A notch prescribed in ISO 2818.

As is evident from Table 2, with the PC resin compositions of examples 5 to 9 containing the polymers (X-1) to (X-4) that are fluidity improvers of the present invention, it was confirmed that the melt fluidity during molding improved without impairing the heat resistance and mechanical properties of the highly heat-resistant PC resin, and also that the external appearance of the resulting molded product was excellent.

In the case of the PC resin composition of comparative example 3, which included the polymer (X'-5) obtained by polymerizing a monomer mixture that did not contain α-methylstyrene, surface layer peeling and swelling were observed in the molded product, and the heat resistance was also unsatisfactory.

In the case of the PC resin composition of comparative example 4, which included the polymer (X'-6) obtained by polymerizing only the monomer mixture (a) and not performing a subsequent polymerization of the monomer mixture (b), silver streaks were generated during molding, and the external appearance of the molded product was poor.

The resin composition of comparative example 5, which did not include the fluidity improver of the present invention, suffered from poor melt fluidity during molding, making the molding process problematic.

Using the PC resin compositions obtained in examples 6 and 9, the evaluations described below were performed. The evaluation results are shown in Table 3, and in FIG. 2 and FIG. 3.

TABLE 3

| Die thickness [mm] | Injection speed [mm/s] | Flow mark appearance ratio | |
|---|---|---|---|
| | | Resin composition of example 6 | Resin composition of example 9 |
| t = 1.0 | 30 | 0 | 0 |
| | 40 | 0 | 0 |
| | 50 | 0.8 | 0.167 |
| | 60 | 1.0 | 0.250 |
| | 80 | — | 1.0 |
| | 120 | — | — |
| t = 1.5 | 30 | 0 | 0 |
| | 45 | 0 | 0 |
| | 60 | 0.750 | 0.286 |
| | 80 | 1.0 | 0.75 |
| | 120 | — | 1.0 |

(Flow Marks)

Using an injection molding machine (AUTOSHOT T-SERIES 150D, manufactured by Fanuc Ltd.), injection molding was performed under the conditions listed below to obtain a molded product.

The molded product was inspected visually for the presence of flow marks (a concentric pattern that appears on the molded product from the gate), and the appearance ratio of these flow marks was determined.

Die: 150 mm×150 mm flat plate, fan gate, t=1.0 mm and 1.5 mm

Die temperature: 120° C.

Molding temperature: 320° C.

Figure 2:
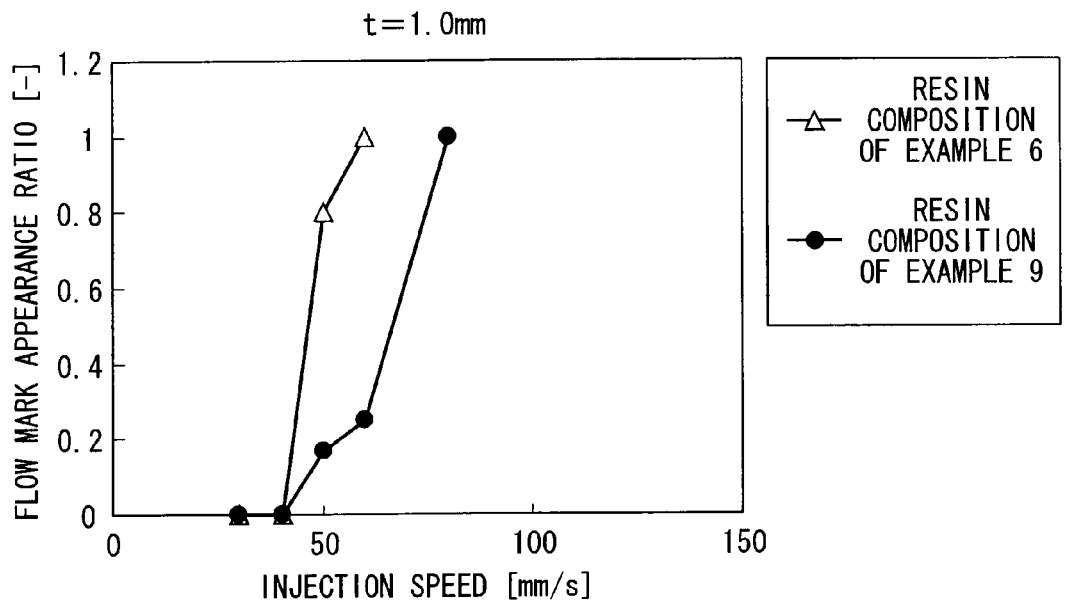
FIG. 2 is a graph illustrating the relationship between the injection speed and the flow mark appearance ratio at t=1.0 mm.
Figure 3:
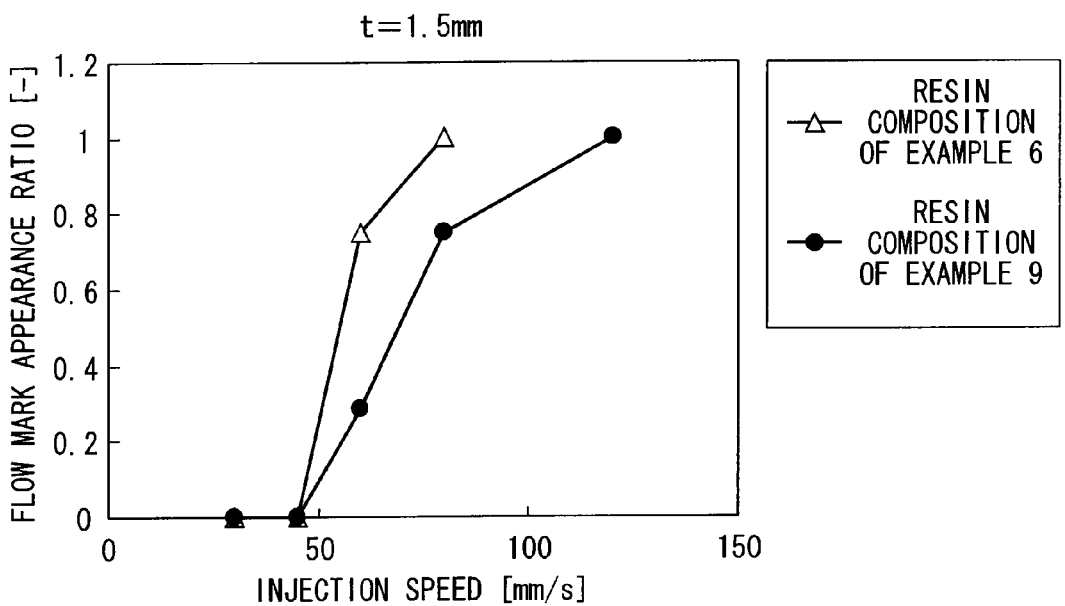
FIG. 3 is a graph illustrating the relationship between the injection speed and the flow mark appearance ratio at t=1.5 mm.

Molding speed: 30, 40, 50, 60, 80 and 120 mm/s when t=1.0 mm 30, 45, 60, 80 and 120 mm/s when t=1.5 mm As is evident from Table 3, FIG. 2 and FIG. 3, compared with the resin composition of example 6 that did not include the PTFE-containing mixed powder, the resin composition of example 9 that did include the PTFE-containing mixed powder exhibited a lower flow mark appearance ratio. With the resin composition that included the PTFE-containing mixed powder, flow mark occurrence was suppressed even when the injection speed was raised, confirming excellent moldability.

INDUSTRIAL APPLICABILITY

By employing the fluidity improver for a PC resin of the present invention, the excellent properties (such as heat resistance and mechanical properties) of PC resins, and particularly highly heat-resistant PC resins, are not impaired, and therefore an improvement in the melt fluidity during molding can be achieved.

The PC resin composition of the present invention exhibits excellent melt fluidity during molding, and is capable of forming a molded product having the excellent properties (such as heat resistance and mechanical properties) of a PC resin, and particularly a highly heat-resistant PC resin.

The molded product of the present invention has the excellent properties (such as heat resistance and mechanical properties) of a PC resin, and particularly a highly heat-resistant PC resin, and is particularly useful as a lamp fitting component for a vehicle and an extension reflector.

The invention claimed is:

1. A fluidity improver for an aromatic polycarbonate resin, comprising a polymer (X) obtained by polymerizing 0.5 to 99.5 parts by mass of a monomer mixture (b) comprising 0.5 to 99.5% by mass of styrene (b1) and 0.5 to 99.5% by mass of phenyl (meth)acrylates (b2),
   in presence of a polymer (A) obtained by polymerizing 0.5 to 99.5 parts by mass of a monomer mixture (a) comprising 0.5 to 50% by mass of α-methylstyrene (a1), 0.5 to 99% by mass of styrene (a2) and 0.5 to 99% by mass of phenyl (meth)acrylates (a3),
   wherein a combined total of (a) and (b) is 100 parts by mass.

2. The fluidity improver for an aromatic polycarbonate resin according to claim 1, wherein a polymerization extent of said polymer (X) is not less than 95% by mass.

3. A method of producing a fluidity improver for an aromatic polycarbonate resin, said process comprising:
   obtaining a polymer (A) by polymerizing 0.5 to 99.5 parts by mass of a monomer mixture (a) comprising 0.5 to 50% by mass of α-methylstyrene (a1), 0.5 to 99% by mass of styrene (a2) and 0.5 to 99% by mass of phenyl (meth)acrylates (a3), and
   polymerizing 0.5 to 99.5 parts by mass of a monomer mixture (b) comprising 0.5 to 99.5% by mass of styrene (b1) and 0.5 to 99.5% by mass of phenyl (meth)acrylates (b2) in presence of said polymer (A),
   wherein a combined total of (a) and (b) is 100 parts by mass.

4. The method of producing a fluidity improver for an aromatic polycarbonate resin according to claim 3, wherein said polymerizing is halted once a polymerization extent has reached at least 95% by mass.

5. An aromatic polycarbonate resin composition, comprising 0.1 to 30% by mass of the fluidity improver for an aromatic polycarbonate resin according to claims 1, and 70 to 99.9% by mass of an aromatic polycarbonate resin.

6. An aromatic polycarbonate resin composition, comprising 0.1 to 30% by mass of the fluidity improver for an aromatic polycarbonate resin according to claims 1, 0.01 to 5% by mass of a polytetrafluoroethylene, and 65 to 99.89% by mass of an aromatic polycarbonate resin.

7. A molded product obtained by molding the aromatic polycarbonate resin composition according to claim 5.

8. The molded product according to claim 7, in the form of lamp fitting component for a vehicle.

9. The molded product according to claim 7, in the form of an extension reflector.

10. An aromatic polycarbonate resin composition, to comprising 0.1 to 30% by mass of the fluidity improver for an aromatic polycarbonate resin according to claims 2, and 70 to 99.9% by mass of an aromatic polycarbonate resin.

11. An aromatic polycarbonate resin composition, comprising 0.1 to 30% by mass of the fluidity improver for an aromatic polycarbonate resin according to claims 2, 0.01 to 5% by mass of a polytetrafluoroethylene, and 65 to 99.89% by mass of an aromatic polycarbonate resin.

12. A molded product obtained by molding the aromatic polycarbonate resin composition according to claim 6.

13. A molded product obtained by molding the aromatic polycarbonate resin composition according to claim 10.

14. A molded product obtained by molding the aromatic polycarbonate resin composition according to claim 11.

15. The molded product according to claim 12, in the form of lamp fitting component for a vehicle.

16. The molded product according to claim 13, in the form of lamp fitting component for a vehicle.

17. The molded product according to claim 14, in the form of lamp fitting component for a vehicle.

18. The molded product according to claim 12, in the form of an extension reflector.

19. The molded product according to claim 13, in the form of an extension reflector.

20. The molded product according to claim 14, in the form of an extension reflector.

21. The fluidity improver according to claim 1, wherein the monomer mixture (b) is free of α-methylstyrene.

22. The method of claim 3, wherein the monomer mixture (b) is free of α-methylstyrene.

* * * * *